United States Patent [19]

Green

[11] 4,029,172

[45] June 14, 1977

[54] FIBERGLASS LADDER AND METHOD OF CONSTRUCTING SAME

[75] Inventor: Andrew Green, Fort Worth, Tex.

[73] Assignee: Composite Technology, Inc., Fort Worth, Tex.

[22] Filed: July 12, 1976

[21] Appl. No.: 704,250

[52] U.S. Cl. .................................. 182/46; 182/194
[51] Int. Cl.² ....................... E06C 1/06; E06C 7/08
[58] Field of Search ............ 182/46, 194, 228, 217, 182/219

[56] References Cited

UNITED STATES PATENTS

| | | | |
|---|---|---|---|
| 2,885,132 | 5/1959 | Campbell | 182/46 |
| 2,932,358 | 4/1960 | Hopfeld | 182/46 |
| 2,936,848 | 5/1960 | Hall | 182/46 |
| 3,085,649 | 4/1963 | Gillman | 182/46 |
| 3,158,224 | 11/1964 | Van Name | 182/46 |
| 3,225,862 | 12/1965 | Fink | 182/46 |
| 3,674,110 | 7/1972 | Cooke | 182/46 |

*Primary Examiner*—Reinaldo P. Machado
*Attorney, Agent, or Firm*—Wofford, Felsman, Fails & Zobal

[57] ABSTRACT

A fiberglass ladder comprising a pair of rails and a plurality of rungs interposed at selected intervals. Each rung and each rail has a continuous layer of fiberglass filaments extending parallel to its respective length. At the intersection of the rails with the rungs, the filaments bend with a portion of the filaments in the rung extending in one direction along the rail, and a portion of the filaments in the rung extending in the other direction along the rail. The ladder is cast in a mold in a solid integral piece. Woven fiberglass is placed in the channels of the mold over a coating of resin. The fiberglass filaments are placed over the fabric in the bottoms of the channels. The channels are then filled wth a rigid plastic foam and the ladder is allowed to cure.

10 Claims, 2 Drawing Figures

U.S. Patent June 14, 1977 4,029,172
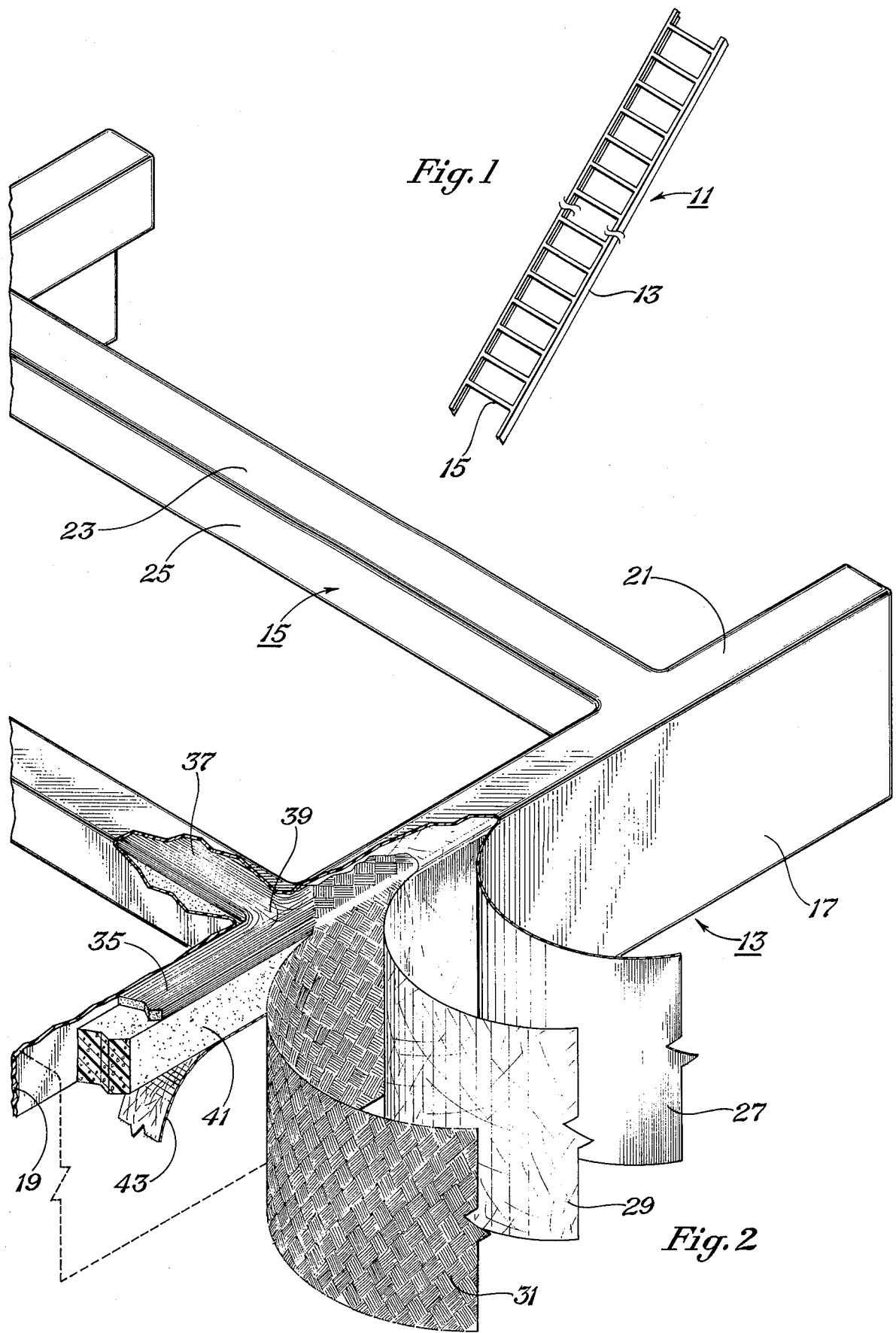

FIBERGLASS LADDER AND METHOD OF CONSTRUCTING SAME

BACKGROUND OF THE INVENTION

1. Field of the Invention

This invention relates in general to ladders and in particular to fiberglass ladders.

2. Description of the Prior Art

Fiberglass ladders are known in the art. They have the advantage of being non-conductive of electricity, are decay and corrosion resistant, and are non-sparking. There are various designs in the prior art, some with fiberglass rails and rungs, others with fiberglass rails and metal rungs, some with hollow cores, and others with solid cores.

As far as is known, however, the rails and rungs are always formed separately, then assembled to form a ladder. Although this may be more efficient from a mass production standpoint, the interconnection or joints between the rails and rungs are troublesome. The joints must withstand loads as well as in some cases corrosive atmospheres such as found in chemical plants and refineries. Various joint designs to solve the problems are found in the following U.S. Pat.: No. 3,318,413 issued to Werner et al; No. 2,885,132 issued to Campbell; and No. 3,674,110 issued to Cooke.

SUMMARY OF THE INVENTION

It is a general object of this invention to provide an improved fiberglass ladder.

It is a further object of this invention to provide an improved fiberglass ladder and method of constructing same in which the ladder is cast in a solid unitary piece.

It is a further object of this invention to utilize continuous fiberglass filament layers to provide strong, lightweight rails, rungs, and the interconnections therebetween.

In accordance with these objects, a fiberglass ladder is provided that is of unitary construction. The sides of the rungs and rails that face outward toward the user contain a continuous layer of unidirectional fiberglass filaments extending parallel to the lengths of the rungs and rails. At the intersections between the rungs and rails, a portion of the filaments bend upward and extend along the rail, and a portion of the filaments bend downward and extend along the rails, thereby forming a continuous fiberglass filament layer throughout the ladder. The ladder is constructed in a mold by laying the fiberglass filaments in the bottom of the channels of the mold on top of woven fiberglass and a resin layer. The channels are then filled with a rigid plastic foam, and the ladder is allowed to cure. A strong, lightweight ladder of unitary construction is thereby provided.

BRIEF DESCRIPTION OF THE DRAWINGS

FIG. 1 is a perspective view of a ladder in accordance with this invention.

FIG. 2 is an enlarged partial perspective view of the ladder of FIG. 1 with the various layers of the ladder peeled back to disclose the structure.

DESCRIPTION OF THE PREFERRED EMBODIMENT

A fiberglass ladder 11 is shown in FIG. 1. It includes a pair of rails 13 and a plurality of rungs 15 disposed between the rails at selected intervals. The ladder may be an extension type, a type mounted to a wall perpendicular to the floor, or other forms.

Referring to FIG. 2, each rail is rectangular in transverse cross-section with its outer side 17 being substantially wider that its inner side 19. The outer side 17 is larger in width in the preferred embodiment to provide rigidity to the ladder. Inner side 19 remains shorter to lighten the overall weight of the ladder. Alternately the inner side 19 and outer side 17 could be approximately equal in width, but the outer side 17 greater in cross-sectional area. The side or face 21 that normally faces the user is approximately the width of inner side 19.

The rungs are also rectangular in configuration having a face 23, which is the side that normally faces the user, that is substantially in the same plane as face 21. The inner sides 25 are normal to the inner side 19 of the rail 17, and are approximately the same width. The face 23 of the rung is approximately the same width as the inner sides 25.

The outer skin or surface seal 27 of the ladder is a layer of resin, normally called gelcoat, for protecting the inner layers from sunlight and damaging chemicals. The second layer or surface scrim 29 is of fiberglass mat. In this layer, the fiberglass pieces are short and randomly oriented. The surface scrim layer 29 is optional, and serves to provide a smooth exterior surface and more protection against deleterious chemicals. It is not necessary that this layer be composed of fiberglass as layers of other compositions may be suitable as well.

The third or shear reinforcing layer 31, located adjacent and on the interior side of the surface scrim layer 29, is of woven fiberglass also known as woven roving. The shear reinforcing layer 31 has continuous fiberglass filaments grouped into a cross-hatched weave. Bands of these filaments are woven together transverse to similar bands. In the preferred embodiment, all of the filaments run transverse or preferably 45° to the length of the rails and rungs. This provides shear reinforcing support in the normal direction of the load. Shear reinforcing that has filaments running parallel and perpendicular to the length of the rungs and the rails will perform satisfactorily also. The surface seal layer 27, surface scrim layer 29, and shear reinforcing layer 31 cover the sides and faces of the rails and rungs.

A continuous layer 35 of unidirectional, individual filaments extends parallel to the length or longitudinal axis of each rail. Within the rail, each filament is substantially parallel to each other and to the length of the rail 13. The continuous filament layer 35 extends across the face 21 of the rail 13.

A continuous layer 37 of unidirectional, individual fiberglass filaments also extends along and substantially parallel to each rung 15. The continuous layers 35, 37 are located adjacent and on the interior side of the shear reinforcing layer 31. The continuous layer 37 is substantially in the same plane as the rail filament layers 35, both layers being substantially flat. At each intersection of a rung with a rail, the filament layers 35, 37 merge. That is, a portion of the filaments in the rung bend and extend along the rail, while another portion of the filaments in the rung bend and extend along the rail in the other direction, as indicated schematically at 39.

The filaments in the layers 35 and 37 are pure fiberglass filaments that range in size from 20 to 50 × 10⁻⁵ inch. The filament layers 35, 37 may be in thickness in the range from 0.06 inch to 0.375 inch, the thickness depending on the span of the rails. Also the layers 35, 37 can extend along the sides 17, 19 and sides of the rungs 15 if desired for additional strength. Although the layer is continuous, in one method of construction each filament is approximately three to five foot in length and has been pulled off spools in bunches or rovings with other filaments. The end of one roving overlaps the end of another roving, and does not abut to avoid weak points. One long continuous roving may be wound through the rungs and rails in another method of construction.

Adjacent the filament layers 35, 37 on the side opposite the shear reinforcing layer 31, the interior or hollow cores of the rungs 15 and rails 13 are filled with a low density rigid plastic foam 41, such as polyurethane. The polyurethane foam helps free voids in the layers or laminate and applies pressure and support to the sides. A cover scrim 43, similar to the surface scrim layer 29, is placed along the outside surface of the plastic foam 41. One embodiment weighs approximately 2 ½ pounds per foot and will withstand a load bearing parallel to the length of the rails of approximately 1,000 to 1,100 pounds.

The ladder is constructed within a mold, which is not shown since it is merely the reverse in appearance of the ladder as shown in FIG. 2. Initially a release agent is applied to the mold, then the surface seal layer 27 is sprayed in the mold. The surface scrim layer 29 and shear reinforcing layer 31 are then placed in the mold. Rovings of fiberglass filaments are pulled from spools and laid along the bottoms, and if desired on the sides, of the channels to form the continuous layers 35, 37. While the laminate is still wet, the polyurethane foam 41 is laid in the mold, the foam being previously cut to size. The cover scrim 43 is then placed on top. The curing is exothermic from a catalyst within the resin, the time being approximately two hours. After curing the ladder is drawn from the mold and is ready for use.

It is accordingly seen that an invention having significant improvements has been provided. The fiberglass ladder of this invention has a unitary construction, avoiding the problems in the prior art concerning the joints between the rungs and rails. The continuous fiberglass filament layers add strength to the rails, rungs and the joints, providing a lightweight ladder that will withstand a substantial load.

The foregoing disclosure and the showings made in the drawings are merely illustrative of the principles of this invention and are not to be interpreted within a limiting sense. For example, the continuous filament layer 37 may, if desired, be not precisely in the same plane as the continuous layer 35. It may be set inward approximately ¼ inch to allow for the overlap as filaments in the rungs are bent at the intersection 39 and laid on top of the rail filament layer 35. In addition, if it is desired to shorten the curing time, the continuous filament layers 35, 37 may be placed in a template in the desired position, then sewed. The layers may then be laid in a single piece on top of the shear reinforcing layer in the bottom of the channels of the mold. A faster catalyst and exterior heat supplied for curing could then be used.

I claim:

1. A fiberglass ladder comprising:
a pair of rails, each of the rails having a continuous layer of fiberglass filaments, the filaments extending substantially parallel to the length of the rail;
a plurality of rungs disposed between and interconnecting the rails at selected intervals, each of the rungs having a continuous layer of fiberglass filaments, the filaments extending substantially parallel to the length of the rung;
the fiberglass filaments in the rails and rungs bending at the intersections between the rails and the rungs, with a portion of the filaments in each rung also extending along each rail in one direction and another portion of the filaments in each rung also extending along each rail in the opposite direction, thereby defining a continuous layer of fiberglass filaments at the intersection.

2. The ladder according to claim 1 wherein the rails and rungs are rectangular in cross-section, with the continuous filament layers in the rails and rungs being on the sides that normally face the user of the ladder.

3. The ladder according to claim 2 wherein the continuous filament layer in the rungs is in substantially the same plane as the continuous filament layer in the rails.

4. The ladder according to claim 1 wherein the interior of the rails and rungs contain rigid plastic foam.

5. The ladder according to claim 1 wherein the rails and rungs further include a layer of woven fiberglass bonded to and adjacent the continuous filament layers.

6. The ladder according to claim 5 wherein the filaments within the woven fiberglass are at an angle of substantially 45° with respect to the lengths of the rails and the rungs.

7. A fiberglass ladder comprising:
a pair of rails having at least one flat side;
a plurality of rungs disposed between and interconnecting the rails at selected intervals, the rungs having at least one flat side that is in a plane that is parallel to the plane of the flat side of the rails.;
a continuous layer of fiberglass filaments disposed along and bonded to the flat sides of the rails and the rungs, the filaments in the rails being parallel to the length of the rails and the filaments in the rungs being parallel to the lengths of the rungs; the continuous layer being continuous at the intersections of the rails and rungs with portions of the filaments in the rungs bending to extend in both directions along the rails;
a layer of woven fiberglass adjacent and on the exterior side of the continuous filament layer; and
rigid plastic foam filling the interior of the rungs and rails.

8. The ladder according to claim 7 further including a layer of fiberglass mat, with short randomly oriented fiberglass pieces, adjacent and on the exterior side of the woven fiberglass.

9. A method for forming a fiberglass ladder comprising the steps of:
providing a mold with channels to correspond with a pair of rails and a plurality of rungs disposed between, interconnecting the rails at selected intervals;
covering the mold with a release agent;
coating the mold with a resin layer;
placing a layer of woven fiberglass in the bottom and sides of the channels;
placing a layer of fiberglass filaments in the bottom of the channels so that the filaments in each channel are parallel to the channel, and with a portion of the filaments bending at the intersections so that portions of the filaments in the rungs also extend in both directions along the rails; and
placing rigid plastic foam within the channels adjacent the fiberglass filaments.

10. The method of claim 9 further including the step of placing a layer of fiberglass mat over the resin layer prior to placing the woven fiberglass in the channels.

* * * * *